United States Patent Office 3,043,303
Patented July 10, 1962

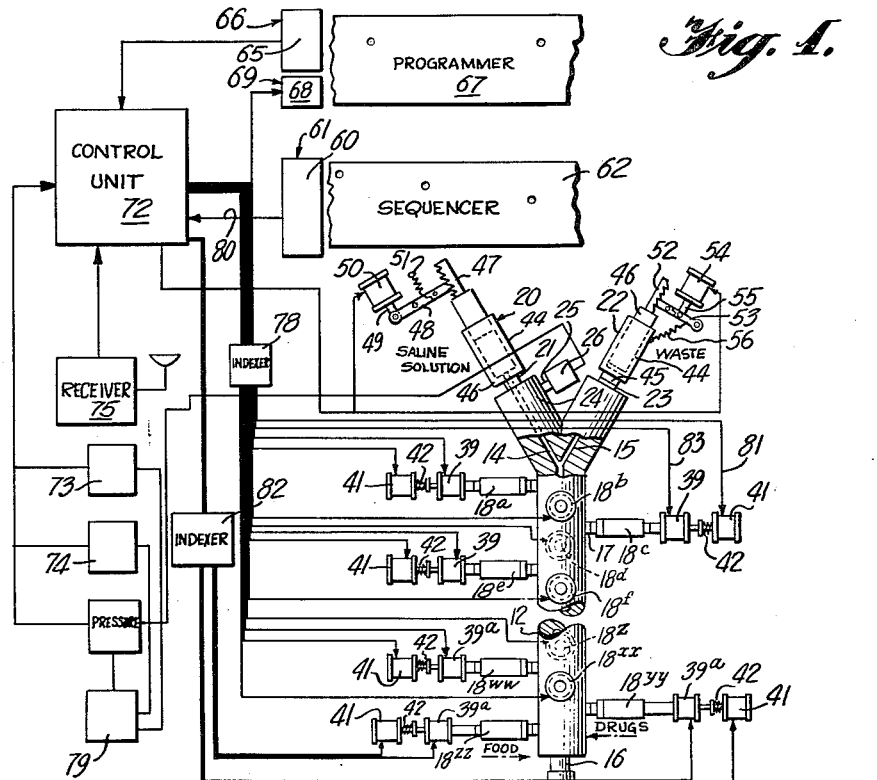

3,043,303
METHOD AND APPARATUS FOR UTILIZING THE PERMANENT LONG TERM AORTA INTUBATION OF A LABORATORY ANIMAL
Joseph W. Still, 1940 Biltmore, Washington 9, D.C.
Filed July 11, 1958, Ser. No. 748,065
19 Claims. (Cl. 128—214)

This invention relates to a method and apparatus to be used in experimental biological research conducted on laboratory animals and more particularly to apparatus for utilizing the method of permanent long-term intubation of the animal's abdominal aorta or other blood vessel for the purpose of taking blood samples or making injections of hormones, drugs, dyes and other substances into the blood stream of the animal.

The technique of opening the abdomen of the animal to expose the aorta while the animal is under anesthesia, permanently implanting a small polyethylene tube in the aorta in a direction contra to the blood flow, placing an anchor suture around the tube at the point of its emergence from the aorta, fastening the suture to the deep back muscles of the animal in this area, carrying the free end of the tube under the skin of the animal and along a path from the belly to a point at the dorsal base of the neck where it is exteriorized and heat sealed is fully explained in an article entitled "Technique for Permanent Long-Term Intubation of Rat Aorta," by Joseph W. Still, M.D., and Ernest R. Whitcomb, M.A., The Journal of Laboratory and Clinical Medicine, vol. 48, No. 1, pages 152–154, July 1956. With suitable modifications, other blood vessels of rats or other animals can be permanently intubated if desired.

This technique affords a living, unanesthetized laboratory animal from which blood samples may be withdrawn in a convenient and painless manner. The animal, after it has recovered from the initial operation, experiences no pain or discomfort from the intubation nor suffers any apparent abnormality. Therefore, there are no physiological, psychological or pathological reactions which might produce effects in an experimental animal overshadowing and obscuring the physiological reactions to the experimental stimuli being tested. Long-term intubation according to this technique provides an opportunity for long range experimentation on the animal, said experimentation being extendible over a period of weeks or even months.

This intubation preparation has been used as a means for directly measuring the aortic blood pressure in unanesthetized laboratory animals, as set forth in an article, "Direct Measurement of Aortic Blood Pressure in Unanesthetized Rats," by Joseph W. Still, Sachandra H. Pradhan and Ernest R. Whitcomb, Journal of Applied Physiology, vol. 8, No. 5, 1956. In accordance with this article, a strain gauge pressure measurement instrument such as that described in U.S. Patent No. 2,573,286 to Statham et al. is connected to the extended end of the exteriorized tube of an intubated animal, the extended portion of the tubing being first filled with a saline solution to act as a barrier to prevent blood from entering the tube and clotting and also as a hydraulic medium to transmit blood pressure to the strain gauge. By connecting the strain gauge to a suitable amplifier equipped with a direct writing pen, a permanent oscillograph record of the blood pressure of the animal during an experiment is obtained.

It should be noted, however, that the techniques described in the above cited article do not, of course, eliminate the necessity of handling the animal, nor do they provide a means of obtaining data during the period of injection of drugs through the aortic tube, nor while an animal is, for example, exercising on a treadmill, nor while it is sleeping, nor while it is distant from the experimenter as when the animal is in the nose-cone of a rocket or satellite or in a gravity accelerator, or under other similar conditions when the experimenter cannot maintain direct contact with the animal.

Consequently, it is an object of the present invention to provide a method and means for collecting blood samples or injecting substances into an intubated laboratory animal without interference with the normal substantially uninhibited movements of the animal.

Another object of the invention is to provide a method and means for controlling the sampling of blood and injecting of fluids into an intubated laboratory animal in accordance with a pre-set program.

Still another object of the present invention is to provide a means of varying said pre-set program in accordance with data originating from stimuli received from the animal itself, as by means of an electro-cardiograph or an electro-encephalograph.

A further object of the present invention is to provide a means for varying said pre-set program by radio or telegraphic means at will or in accordance with conditions originating from a source apart from the animal, as during testing experimentally associated equipment such as equipment to cancel the effect of increased gravity in a gravity accelerator.

A still further object of the present invention is to provide a means for immediate transmission by radio or telegraph of intelligence obtained electrolytically from the sampled blood.

A still further object of the present invention is to provide a means of recording the time at which each sample is collected so that the sample may be later identified.

Other objects and advantages of the present invention will become apparent to those skilled in the art to which it appertains from the following description when it is read in conjunction with the accompanying drawings illustrating one exemplary preferred embodiment of the invention: wherein, FIG. 1 is a schematic drawing showing the Y-tube of the present invention connected to an intubated laboratory animal and the associated electronic and mechanical components for collecting samples of blood from the animal automatically according to a preset program which also provides a means for overriding said program upon the happening of special events, the relative size of components not being shown in proportion;

FIG. 2 is an enlarged vertical cross-sectional view through portions of the Y-tube and associated blood collecting and medicine injecting syringes.

The term "animal" as used hereafter will refer to a laboratory animal such as a rat, guinea pig, dog, monkey, sheep, horse or the like, intubated in the general manner described in the article "Technique for Permanent Long-Term Intubation of Rat Aorta" hereinbefore referred to, but not necessarily in the aorta.

The term "vehicle" as used hereafter will refer to an enclosure which is remote from the experimenter and may be a treadmill, a gravity accelerator, a bathysphere, a space vehicle or the like.

In addition to collecting samples of blood automatically according to a pre-set program, the invention contemplates means for collecting special blood samples upon the happening of special events. By way of example, an electrode of an electro-encephalograph may be inserted in the brain of the animal, electrodes of an electro-cardiograph may be attached to or under the skin of the animal, and a pressure transducer may be connected into the blood sampling system to continuously measure blood pressure.

Means may be associated with each of these electronic monitoring devices to cause special blood sampling to occur upon the detection of pre-selected conditions by one or more of the monitoring devices. An additional part of the system may include a radio receiver for receiving signals from a remote station which would permit overriding the pre-selected program in order to carry out instructions sent by said radio. A part of the system will be a permanent time record which will indicate the time at which each sample was collected so that each sample may later be identified.

In addition to collecting blood samples the present invention contemplates injecting substances such as food, medicine, dyes or chemicals into the animal by way of the implanted tube.

The present invention will be described with respect to collecting samples of blood from an animal in one of said vehicles, the experiment extending over a period of time, for example, approximately five days.

An example of a pre-set program which may be set up for collecting samples of the animal's blood might be related to the starting time, $t_0$, of the vehicle. Thus, the first sample may be collected at $t_0$ minus 10 minutes. Other samples would be collected at for example, 2 minutes before $t_0$, $t_0$ plus five seconds, $t_0$ plus 20 seconds, 5 minutes after $t_0$ 12 hours after $t_0$, with further samples being taken 1, 2, 3, 4 and 5 days respectively after $t_0$.

After a period of training and conditioning, the necessary preliminary surgery is performed on the animal. The surgery includes inserting a suitable gauge polyethylene or other flexible, plastic type tube in the abdominal aorta or other blood vessel, the tube being first filled with heparinized saline solution and the outer end heat sealed. The sealed end of the tube is exteriorized at the dorsal base of the neck of the animal or at some other convenient location, all as described in principle in the articles referred to hereinbefore. Additional surgery may include inserting an electrode in the brain of the animal or electrodes in or under the skin of the animal. During the post-surgical healing period, conditioning and training will continue.

On the day the experiment begins the animal is placed in the vehicle and hooked up to the various instruments. The brain electrodes if any, will be coupled with the electro-encephalograph and the skin electrodes, if any, will be coupled with the electro-cardiograph in a well-known manner to obtain a record of the electrical brain and heart waves of the animal.

Adverting now to the figures and more particularly to FIG. 1, there is shown an animal 10 having an aorta tube 11 emerging from the dorsal base of its neck. A Y-tube, or blood column tube 12 made of suitable material such as stainless steel to resist shock, has a small gauge main bore 13 in the leg of the tube with communicating branch main bores 14 and 15 in the arms of the tube. The foot of the leg portion is provided with a suitable connector means 16 to receive the implanted tube 11. A plurality of spirally spaced fittings or nipples are threadedly mounted on the leg of the Y-tube 12 to provide connection means for a plurality of blood sampling syringes 18.

A large capacity saline supply syringe 20 is connected to a fitting 21 at the outlet of branch main bore 14 to place it in communication with said bore. In like manner a large capacity syringe 22 for collecting waste fluid is connected to a fitting 23 at the outlet of the branch main bore 15. A radially extending lateral bore 24 in communication with the bore 14 terminates at the exterior of the arm of Y-tube 12 in a fitting 25 to which is connected a strain gauge measuring instrument or pressure transducer 26, such as that described in U.S. Patent No. 2,573,286.

Prior to cutting off the seal at the end of the animal's exteriorized implanted tube to attach it to the connector 16, the main bore 13 and branch main bores 14 and 15 are filled with heparinized saline solution. Said saline solution contains a blood anticoagulant to prevent clotting at the interface of the solution with the animal's blood. The saline solution forms a barrier, or liquid valve, to hold the animal's blood within its circulatory system until a sample is desired. It also provides a hydraulic medium for transmitting blood pressure pulsations from the animal's blood system to the pressure transducer 26 for direct measurement of the blood pressure.

Adverting now to FIGURE 2, there is shown an enlarged view of several of the blood collecting or substance injecting syringes, the number of which may be, for example, 56 and these have been designated as a group by the numeral 18. The upper group of syringes 18a through 18d may be used for collecting blood and the lower group, such as 18zz may be used for injecting food, medicine, dyes and other chemicals into the animal's blood stream. With the exception of the solenoid operators, the syringes 18 are similarly constructed and they are of an accurately formed type of syringe, such as a syringe made in accordance with U.S. Patent No. 2,392,104 having a glass barrel 27 and a glass plunger 28. A metal ferrule 29 is heat sealed to the tip 30 of the barrel 27. The ferrule 29 is threadedly mounted in the outlet end 31 of the fitting 17.

The fitting 17 is provided with a valve cage 32 to receive a ball valve 33 and the aperture 34 is reamed to form a seat 35 for said ball valve. The plunger 28 is provided with an axial bore 36 to receive a valve stem 37 made of non-magnetizable material, such as copper or a synthetic resin plastic. The plunger 28 is also provided with an axially extending tube 38 having an insert of magnetizable metal which functions as the armature of a solenoid 39 or 39a. The valve stem 37 slidingly passes through the tube 38 and terminates in a magnetizable rod 40 which functions as the armature of the solenoid 41.

Each of the solenoids 41 are similarly wound and when energized move the ball valve 33 away from its seat 35. Stop means (not shown) are provided to prevent closing the passageway through the fitting 17. A spring 42 interposed between the solenoid 41 and the valve stem 37 biases the ball valve 33 toward its seat 35 so that when the solenoid 41 is de-energized, the spring 42 will return the valve to its seat.

Each of the solenoids 39 for the blood collecting syringes 18a through 18dd are similarly wound and when energized withdraw the plunger 28 to collect blood.

Each of the solenoid 39a for the substance injecting syringes, such as 18zz are similarly wound and when energized force the plunger inwardly to expel the substance from the syringe.

The syringes 20 and 22 have a volume equal to many times the combined volumes of all the syringes 18. For convenience in illustrating the invention this difference in volume is not indicated in FIGURE 1. The fittings 23 and 21 do not have a valve cage, and no valve is shown for these syringes. The syringes 20 and 22 are similar and each has a barrel 44 having a metal ferrule 45 sealed to its tip and threadedly received in their respective fittings 23 and 21. The plunger for the syringe 20, like the plunger 46 for the syringe 22, is provided with an indexing or stepwise actuator, which may, for example, include an axially extending ratchet member 47 mounted on the end of said plunger, and a pawl 48 pivotally mounted at its midpoint having one end engaging the teeth of the ratchet member 47 and the other end connected to the armature 49 of a solenoid 50. When the solenoid 50 is energized the teeth of the member 47 are so disposed that the pawl 48 moves the plunger of the syringe 20 one step or increment to expel fluid from the syringe. A spring 51 returns the pawl 48 to engage the next tooth of the ratchet member 47 when the solenoid 50 is de-energized.

In like manner, the plunger 46 of the syringe 22 may be provided with a ratchet member 52. A pawl 53 is pivotally mounted at one end and has its other end in engagement with the ratchet member 52. A solenoid 54 has its armature 55 connected at the midpoint of the pawl 53. When the solenoid 54 is energized the pawl 53 moves the plunger 46 one step or increment outwardly to draw fluid into the syringe, and a spring 56 returns the pawl to the next tooth of the ratchet member 52.

To collect a sample of blood in accordance with the present invention the solenoid 54 is energized to draw the saline solution barrier from the implanted tube 11 and the leg of the Y-tube thus allowing the blood of the animal to flow into the leg of the Y-tube to a height above the topmost of the fittings 17. The solenoid 41 is then energized to open the ball valve 33 and hold it open. Energization of solenoid 39 next follows to retract the plunger 28 and draw the animal's blood into one of the syringes of group 18a to 18d. The solenoid 41 is then de-energized and spring 42 will move the ball valve 33 to closed position. Finally solenoid 50 is energized to expel a fresh supply of saline solution into the main bore 13 and attached implanted tube thus clearing the system of blood and returning the animal's blood to its vascular system.

The electronic means for carrying out the sequence of operations described may take many different forms and the same is true of the equipment for providing a program having provision for overriding the pre-arranged program upon the happening of special events. The design of such equipment is well within the skill of a person skilled in the art. The exact form which such equipment may take for a specific environment may vary considerably from that selected for another environment.

In FIGURE 1 there has been shown one group of components for carrying out the invention, but the invention is by no means limited to such specific components.

Numeral 60 denotes a sensing head for a punched tape recorder of a well known type which will be referred to as a "sequencer" 61. The tape 62 is a continuous band, a point on which will travel past the sensing head 60 once in 5 to 8 seconds, for example, this being the length of time required to empty the saline solution barrier and make the animal's blood available at the blood collecting syringes, take a sample of blood and restore the saline solution barrier.

The sensing head 60 may, in the simple illustration hereinafter described have six sensing elements or feelers, for initiating the sequence of events for sampling the blood.

The numeral 65 denotes the sensing head of a second punched tape reader which will be referred to as the "programmer" 66. In this case the reader will be driven by clockwork and a program for an exemplary 5-day experiment will be set up on the tape 67. The sensing head 65 will have but one feeler in the example being used to illustrate the invention.

The numeral 68 denotes the punching head of a punch machine which will be referred to as "recorder" 69. The recorder 69 punches the tape 67 which serves both the programmer 66 and the recorder 69, said tape 67 being driven by a time clock motor which also prints time notations on the tape 67. Each time the sequencer 61 operates the recorder 69 punches tape 67.

While the sensing head 65 has been referred to as the sensing head of a "programmer" 66, this portion of the overall program is that which is pre-set before the experiment begins. It is a part of the overall program of the experiment to have blood samples collected apart from the pre-set portion of the experiment. Therefore, a control unit 72 is provided and all of the output signals of the overall program are channeled into said unit. An electro-cardiograph 73, an electro-encephalograph 74, a radio receiver 75 as well as the blood pressure transducer 26 are representative of instruments which will be used for special sampling of blood in accordance with the overall program.

Impulses from the sensing heads 65 and 60 of the program and sequence tape readers, respectively, together with the output signals of the pressure transducer 26, the electro-cardiograph 73, the electro-encephalograph 74, and the radio receiver 75 or such other remote control receiving facility are all channeled into the control unit 72. The control unit 72 may take the form of a plural relay network together with such amplifying, routing, coordinating and like circuit facilities as may be desired to be associated therewith, all embodying designs and techniques well-known to persons skilled in the electrical and electronic design arts, to provide the control and routing of voltages to the various slave devices of the system such as the solenoids associated with the various syringes. For example, the control unit 72 may be provided with a plurality of relays whose contacts are incorporated in energizing circuits in a well-known manner to perform the following functions:

Activate the sequencer motor which drives the sequencer tape 62 in response to detection of a punch hole of the master program tape 67;

Energize the solenoids 54, 50 and the solenoids 41 and 39 associated with the various syringes designated as a group by the reference character 18 in response to punch holes in selected columns of the sequencer tape 62 in sequence established by the time-position relationship of the punch holes;

Activate an indexer 78 in a stepwise fashion to route the time related output signals derived from the sequencer tape 62 to the solenoids 41, 39 associated with the syringe in the group of syringes 18 desired to be controlled to take a selected sample;

Activate the punch mechanism 69 in selected time relation to the detection of punch holes in the program tape 67 to indicate that the control unit 72 has responded to the demand of the program tape 67 or other controlling facility to take a sample;

Disable the ability of the control unit 72 to respond to a command from the program tape 67 to take a sample during the period when the control unit has responded to commands from other sources to take a sample, such as the devices 73, 74, and 26 so that the control unit will respond during a single sampling period only to the command from any of the latter named devices;

Energize a modulator, or the like, associated with a transmitter 79, if desired, so as to impose intelligence on the signal sent by the transmitter to denote conditions monitored by the monitoring devices 73, 74 and 26; and, Activate solenoids for any other slave functions desired to be performed by the system.

It will be recognized that the selection of particular circuit elements and circuitry for the control unit 72 is a matter well within the skill of any qualified electrical circuit designer and further elaboration upon such details is unnecessary to this application.

In the exemplary preferred embodiment herein shown, there is interposed between the control unit 72 and the slave solenoids 39, 41 and intercoupled therewith, the indexer mechanism 78 which is designed to route the output signals from the control unit 72 designed for the solenoids 39, 41 to those solenoids associated with the particular syringe to be activated for a given sampling. Such an indexer may take the form of a stepped, solenoid operated multi-terminal switch having, for example, a pair of insulated disks having contact terminals spaced along the periphery thereof and each having a centrally pivoted radial arm adapted to be indexed by the solenoid from contact to contact about the axis of the disks, the arms associated with the two contact disks being connected to the two output leads from the control unit 72 supplying the signal for the solenoids 39, 41. Obviously, electronic gating means responsive to designated signal outputs from the control unit 72 may also be used for routing the control signals to the slave solenoids 39 and 41.

A typical experiment would be as follows:

The programmer 66, having its tape 67 punched for time intervals to take blood at selected intervals is set in operation when the animal is placed in the vehicle and connected to the several instruments. The first punched hole on the program tape 67 will arrive at the sensing head 65 at ten minutes before $t_0$ time. The signal will travel from the sensing head 65 to the control unit 72 where it closes relay contacts to start the motor that drives the sequencer tape 62 and also closes contacts to cause the punching head 68 of the recorder 69 to punch the tape 67 and thereby record the time of collecting a blood sample. The first punched hole of the sequencer tape 62 is sensed by the sensing pin for the first column of the tape and sends a signal to the control unit 72 through cable 80 to energize a relay whose contacts close the energizing circuit to solenoid 54 which retracts plunger 46 a short distance to withdraw the saline solution barrier.

The punched hole in the second column of the sequencer tape 62 arrives at the second sensing pin in sensing head 60 and sends an impulse to control unit 72 to energize another relay whose contacts apply voltage to one of the input terminals of the indexer 78 and thence through the switch arm of said indexer and lead 81 to solenoid 41 for retracting ball valve 33.

The next punched hole on the sequencer tape 62 is sensed by a third sensing pin and the impulse applied to the control unit 72 closes relay contacts in a circuit including the second terminal of indexer 78, the indexer switch arm and lead 82 to energize solenoid 39 which retracts the plunger 28 and draws off a sample of the animal's blood.

The relay or other mechanical or electronic means controlling the solenoid 41 has suitable means for holding the relay contact closed for a pre-selected interval of sufficient duration to hold the solenoid 41 in energized condition until the plunger 28 has had time to draw off its sample and then de-energize the solenoid 41, whereupon the spring 42 urges the ball valve 33 to closed position.

The next punched hole of the sequencer tape 82 is sensed by a fourth sensing pin and the impulse activates a relay in the control unit 72 to apply voltage to solenoid 50 to express a fresh supply of saline solution into the Y-tube 12 and force the animal's blood back to its aorta.

The next punched hole on the sequencer tape 62 is sensed by a fifth sensing pin and the impulse activates a relay in control unit 72 to energize the solenoid in indexer 78 which rotates the two-pole armature of said indexer one notch, so that on the next motivation of the sequencer 61 the blood sampling syringe 18b will collect the blood.

The last hole on the sequencer tape 62 is sensed by the sixth sensing pin in sensing head 60 to apply an impulse to control unit 72 to de-energize the relay switch which started the motor of the sequencer 61.

The next hole on the programmer tape 67 will arrive at the sensing pin of sensing head 65 two minutes before $t_0$ time and in a manner similar to that already described, the sequencer motor will be started, the first sequencer sensing pin will withdraw the barrier, the second will cause solenoid 41 of syringe 18b to withdraw valve 33, the third will energize solenoid 39 of syring 18b to collect a sample, the fourth will energize solenoid 50 to express a fresh supply of saline solution, the fifth will actuate the solenoid of the indexer 78 to cause the armature to rotate another notch so that on the next motivation of the sequencer 61 a sample will be collected by syringe 18c, and the sixth sensing pin will stop the sequencer motor. Further samples may be taken at $t_0$ plus 5 seconds, $t_0$ plus 20 seconds, $t_0$ plus 60 seconds, $t_0$ plus 6 hours, $t_0$ plus 12 hours, $t_0$ plus 1, 2, 3, 4, and 5 days, respectively.

Further, if the animal should become very excited or comatose, signalling means of well known design responsive to the electro-encephalograph 74 will send an impulse into the control unit 72 to start the sequencer 61 to cause a special blood sample to be collected and record the time of collecting it. The signalling means would be designed so that normal brain waves will not produce a sequencer actuating signal but brain waves above a predetermined value and those below a predetermined value will produce a signal to start the sequencer. In like manner excessive or subnormal muscular waves will cause the electro-cardiograph 73 to produce a sequencer actuating signal. Excessive or subnormal blood pressure may through pressure transducer 26 cause the taking of blood samples in like manner.

Impulses may arrive at the sequencer simultaneously. Since the relay in the sequencer motor circuit may be energized by any one of the several sources, two or more impulses at the same time will not interfere with its operation.

The operation of the electro-encephalograph, electrocardiograph and blood pressure transducer may be easily transmitted in well known manner to a remote station by radio transmitter 79. Also these instruments could be provided with gates to inactivate their activation of the sequencer 61 for desired periods of time after each activation to prevent excessive blood sampling.

The sequence of operation for the injection syringes 18e to 18zz is similar to that described for the blood collecting syringes. The only physical difference is that the injection syrings have solenoids 39a which operate in a direction opposite to that of the solenoids 39. Indexer 82 for the injection syringes is similar in operation to the indexer 78 except that it serves groups of syringes, each group having one of the drugs, foods, dyes or chemicals. Indexer 82 therefore contains several of the solenoid, step-type switches.

The impulse of the sequencer 61 channeled through a relay system in control unit 72 to transmit them through the proper switch in indexer 82 will bring about the sequence to cause injection of one of the substances in the animal's blood. Thus, the first sensing pin causes solenoid 54 to raise the saline barrier, the second pin causes solenoid 41 of injection syringes 18zz for example, to retract the ball valve, the third pin causes solenoid 39a to inject food, for example, into the column of the animal's blood, spring 42 closes the ball valve, the fourth pin restores the barrier and forces the blood containing the injected food into the animal's circulatory system, the fifth pin causes the indexer switch to rotate a notch so that the next food injection will be from the next syringe containing food. The sixth pin will stop the sequencer motor. An additional sensing pin may be added to the programmer 66 and a pre-set feeding or other injection program may be punched in a corresponding column on tape 67. Also radio 75 may be the source of impulses to cause feeding.

Over a separate circuit in control unit 72 and indexer 82 drugs, dyes and chemicals may be administered to the animal and the source of impulses for this purpose may be the radio receiver, the electro-cardiograph, the pressure transducer or the electro-encephalograph, if desired.

It will be understood that adequate support for the solenoids, syringes and other components will be provided for and that measures will be taken to cushion the equipment against shock. Also, that the animal will have restraining means to prevent injury to itself and damage to the equipment.

While there has been disclosed in the foregoing description an exemplary embodiment of the method and means of utilizing the permanent long-term intubation of an animal's circulatory system for taking blood samples according to a predetermined program when the animal is at a station distant from the experimenter in accordance with the present invention, it will be understood by those skilled in the art that variations in the implementation of the concept of the invention and in the technique employed in the carrying out of the method are within the purview and scope of the invention.

What is claimed is:

1. Apparatus for utilizing the permanent long-term intubation of the abdominal aorta or other blood vessel of a laboratory animal for the purpose of collecting a plurality of blood samples from the animal comprising, a conduit, means for attaching an implanted tube of said intubated animal to the conduit, means for filling the conduit and implanted tube with saline solution to provide a barrier to hold the animal's blood within its circulatory system, means operable in repetitive cycles of operation for withdrawing the saline barrier from the conduit and implanted tube to draw the animal's blood into the conduit, means for withdrawing a selected quantity of the animal's blood from the conduit into a sample collecting receptacle to provide a blood sample and for introducing saline solution into the said conduit and implanted tube to provide a new barrier, and means for repeating the cycle of operation for a selected plurality of cycles, the blood samples being withdrawn into a different sample collecting receptacle for each cycle.

2. Apparatus for utilizing the permanent long-term intubation of the abdominal aorta or other blood vessel of a laboratory animal for the purpose of collecting a plurality of blood samples from the animal comprising, a conduit, means for attaching an implanted tube of said intubated animal to the conduit, means for filling the conduit and implanted tube with saline solution to provide a barrier to hold the animal's blood within its circulatory system, means operable in repetitive cycles of operation for withdrawing the saline barrier from the conduit and implanted tube to draw the animal's blood into the conduit, means for withdrawing a selected quantity of the animal's blood from the conduit into a sample collecting receptacle to provide a blood sample and for introducing saline solution into said conduit and implanted tube to provide a new barrier, means for repeating the cycles of operation for a selected plurality of cycles, the blood samples being withdrawn into a different sample collecting receptacle for each cycle, means for discontinuing said repetitive cycle of operation for a temporary discontinuation period upon occurrence of selected physiological conditions, and means for performing a special cycle of operation of withdrawing the saline barrier and for withdrawing a sample of blood into a special sample collecting receptacle and introducing a substance into the animal's blood in the conduit before the saline barrier is restored.

3. Apparatus for utilizing the permanent long-term intubation of the abdominal aorta or other blood vessel of a laboratory animal for the purpose of collecting a plurality of blood samples from the animal comprising, a conduit, means for attaching an implanted tube of said intubated animal to the conduit, means for filling the conduit and implanted tube with saline solution to provide a barrier to hold the animal's blood within its circulatory system, means operable in repetitive cycles of operation for withdrawing the saline barrier from the conduit and implanted tube to draw the animal's blood into the conduit, means for withdrawing a selected quantity of the animal's blood from the conduit into a sample collecting receptacle to provide a blood sample and for introducing saline solution into said conduit and implanted tube to provide a new barrier, means for repeating the cycle of operation for a selected plurality of cycles, the blood samples being withdrawn into a different sample collecting receptacle for each cycle, and means for interrupting said repetitive cycle of operation immediately following the withdrawing of the saline barrier, means for thereupon introducing a substance into the animal's blood in the conduit, and means for restoring said repetitive cycle of operation to restore the saline barrier.

4. Apparatus for utilizing the permanent long-term intubation of the abdominal aorta or other blood vessel of a laboratory animal for the purpose of collecting a plurality of blood samples from the animal comprising, a blood column tube, means for connecting one end of said blood column tube to an implanted tube of the animal, terminal receptacle means mounted at the other end of said blood column tube and in communication therewith, a plurality of lateral blood collection receptacle means mounted along said blood column tube in spaced relation and in communication therewith, means for introducing a saline solution barrier in said blood column tube to provide a liquid valve against the animal's blood system, actuating means for said terminal receptacle means to express fluid therefrom into said blood column tube and withdraw fluid into said terminal receptacle means from said blood column tube, and actuating means for said lateral blood collection receptacle means to withdraw fluid from said blood column tube into said lateral blood collection receptacle means.

5. Apparatus for utilizing the permanent long-term intubation of the abdominal aorta or other blood vessel of a laboratory animal for the purpose of making a plurality of substance injections into the circulatory system of the animal comprising, a blood column tube, means for connecting one end of said blood column tube to an implanted tube of the animal, terminal receptacle means mounted at the other end of the said blood column tube and in communication therewith, a plurality of lateral substance injection means mounted along said blood column tube in spaced relation and in communication therewith, means for introducing a saline solution barrier in said blood column tube to provide a liquid valve against the animal's blood system, actuating means for said terminal receptacle means to express fluid therefrom into said blood column tube and withdraw fluid into said terminal receptacle means from said blood column tube, and actuating means for said substance injection means to express said substance into said blood column tube.

6. Apparatus for utilizing the permanent long-term intubation of the abdominal aorta or other blood vessel of a laboratory animal for the purpose of collecting a plurality of blood samples from the animal comprising, a Y-tube having a leg and a pair of arms, means for connecting said leg to an implanted tube of the animal, a saline solution supply means mounted at the end of one of said arms and in communication therewith, a saline solution receptacle means mounted at the end of the other of said arms and in communication therewith, a plurality of blood collection receptacle means mounted in spaced relation along said leg of said Y-tube and in communication therewith, means for introducing a saline solution barrier in said Y-tube to provide a liquid valve against the animal's blood system, actuating means for said saline solution supply means to express saline solution into said Y-tube, actuating means for said saline solution receptacle means to withdraw saline solution from said Y-tube, and actuating means for each of said blood collection receptacle means for withdrawing blood from said Y-tube when said saline solution barrier has been drawn into said saline solution receptacle means.

7. Apparatus for utilizing the permanent long-term intubation of the abdominal aorta or other bleed vessel of a laboratory animal for the purpose of making a plurality of substance injections into the circulatory system of the animal comprising, a Y-tube having a leg and a pair of arms, means for connecting said leg to an implanted tube of the animal, a saline solution supply means mounted at the end of one of said arms and in communication therewith, a saline solution receptacle means at the end of the other of said arms and in communication therewith to provide a liquid valve against the animal's blood system, a plurality of substance injection means mounted in spaced relation along said leg of said Y-tube and in communication therewith, a saline solution barrier in said Y-tube, actuating means for said saline solution supply means to express saline solution into said Y-tube, actuating means for said saline solution receptacle means to withdraw saline solution from said Y-tube, and actuating means for each of said substance injection means for injecting substance into the animal's blood in said Y-tube when said saline solution barrier has been drawn into said saline solution receptacle means.

8. Apparatus for utilizing the permanent long-term intubation of the abdominal aorta or other blood vessel of a laboratory animal for the purpose of collecting a plurality of blood samples from the animal comprising, a blood column tube, means for connecting one end of said blood column tube to an implanted tube of the animal, terminal receptacle means mounted at the other end of said blood column tube and in communication therewith, a plurality of lateral blood collection receptacle means mounted along said blood column tube in spaced relation and in communication therewith, means for introducing a saline solution barrier in said blood column tube to provide a liquid valve against the animal's blood system, actuating means for said terminal receptacle means to express fluid therefrom into said blood column tube and withdraw fluid into said terminal receptacle means from said blood column tube, actuating means for said lateral blood collection receptacle means to withdraw fluid from said blood column tube into said lateral blood collection receptacle means, means for automatically cycling said actuating means through a sampling cycle to successively withdraw saline solution from said blood column tube into said terminal receptacle means, withdraw a blood sample from said blood column tube into one of said blood collection receptacle means, and express saline solution into said blood column tube from said terminal receptacle means to restore said barrier in repetitive cycles, and means for conditioning said actuating means associated with said blood collection receptacle means to actuate a different blood collection receptacle means during each cycle in a pre-selected order of succession.

9. Apparatus for utilizing the permanent long-term intubation of the abdominal aorta or other blood vessel of a laboratory animal for the purpose of collecting a plurality of blood samples from the animal comprising, a blood column tube, means for connecting one end of said blood column tube to an implanted tube of the animal, terminal receptacle means mounted at the other end of said blood column tube and in communication therewith, a plurality of lateral blood collection receptacle means mounted along said blood column tube in spaced relation and in communication therewith, means for introducing a saline solution barrier in said blood column tube to provide a liquid valve against the animal's blood system, actuating means for said terminal receptacle means to express fluid therefrom into said blood column tube and withdraw fluid into said terminal receptacle means from said blood column tube, actuating means for said lateral blood collection receptacle means to withdraw fluid from said blood column tube into said lateral blood collection receptacle means, means for automatically cycling said actuating means through a sampling cycle to successively withdraw saline solution from said blood column tube into said terminal receptacle means, withdraw a blood sample from said blood column tube into one of said blood collection receptacle means, and express saline solution into said blood column tube from said terminal receptacle means to restore said barrier in repetitive cycles, means for conditioning said actuating means associated with said blood collection receptacle means during each cycle in a pre-selected order of succession, means for monitoring selected physiological conditions of the animal, means responsive to the detection of specific conditions of said monitoring means to cycle said actuating means through a single said blood sampling cycle, and means responsive to signals from a remote signalling station to cycle said actuating means through a single said blood sampling cycle.

10. Apparatus for utilizing the permanent long-term intubation of the abdominal aorta or other blood vessel of a laboratory animal for the purpose of collecting a plurality of blood samples from the animal comprising, a Y-tube having a leg and a pair of arms, means for connecting said leg to an implanted tube of the animal, a saline solution supply means mounted at the end of one of said arms and in communication therewith, a saline solution receptacle means mounted at the end of the other of said arms and in communication therewith, a plurality of blood collection receptacle means mounted in spaced relation along said leg of said Y-tube and in communication therewith, means for introducing a saline solution barrier in said Y-tube to provide a liquid valve against the animal's blood system, actuating means for said saline solution supply means to express saline solution into said Y-tube, actuating means for said saline solution receptacle means to withdraw saline solution from said Y-tube, and actuating means for each of said blood collection receptacle means for withdrawing blood from said Y-tube when said saline solution barrier has been drawn into said saline solution receptacle means, means for automatically cycling said actuating means through a sampling cycle to successively withdraw saline solution from said Y-tube into said saline solution receptacle means withdraw a blood sample from said Y-tube into one of said blood collection receptacle means, and express saline solution into said Y-tube from said saline solution supply means to restore said barrier in repetitive cycles, and means for conditioning said actuating means associated with said blood collection receptacle means to actuate a different blood collection receptacle means during each cycle in a pre-selected order of succession.

11. Apparatus for utilizing the permanent long-term intubation of the abdominal aorta or other blood vessel of a laboratory animal for the purpose of collecting a plurality of blood samples from the animal comprising, a Y-tube having a leg and a pair of arms, means for connecting said leg to an implanted tube of the animal, a saline solution supply syringe mounted at the end of one of said arms and in communication therewith, a waste saline solution syringe mounted at the end of the other of said arms and in communication therewith, a plurality of blood collection syringes mounted in spaced relation along said leg of said Y-tube and in communication therewith, a saline solution barrier in said Y-tube, actuating means for said saline solution supply syringe to express saline solution into said Y-tube to provide a liquid valve against the animal's blood system, actuating means for said saline solution waste syringe to withdraw saline solution from said Y-tube, actuating means for each of said blood collection syringes for withdrawing blood from said Y-tube when said saline solution barrier has been drawn into said saline waste syringe, sequencer means coupled with said actuating means for said saline solution supply syringe, said saline solution waste syringe and one of said blood collection syringes, respectively, for actuating in sequential order said saline solution waste syringe to withdraw said saline solution barrier, one of said blood collection syringes to collect a sample of blood and said saline solution supply syringe to provide a new saline solution barrier, means to index said blood collection syringe actuating means sequentially upon each operation of said sequencer, programmer means for activating said sequencer means at a plurality of selected time intervals to operate through a sequencer cycle, and means for recording timewise each operation of said sequencer means.

12. Apparatus for utilizing the permanent long-term intubation of the abdominal aorta or other blood vessel of a laboratory animal for the purpose of collecting a plurality of blood samples from the animal and injecting substances into the animal's circulatory blood system comprising, a Y-tube having a leg and a pair of arms, means for connecting said leg to an implanted tube of the animal, a saline solution supply means mounted at the end of one of said arms and in communication therewith, a saline solution receptacle means mounted at the end of the other of said arms and in communication therewith to provide a liquid valve against the animal's blood system, a plurality of blood collection receptacle means mounted in spaced relation along a portion of said leg of said Y-tube and in communication therewith, a plurality of substance injection means mounted in spaced relation along another portion of said leg of said Y-tube and in communication therewith, a saline solution barrier in said Y-tube, actuating means for said saline solution supply means to express saline solution into said Y-tube, actuating means for said saline solution receptacle means to withdrawn saline solution from said Y-tube, actuating means for each of said plurality of blood collection receptacle means to withdraw blood from said Y-tube when said saline solution barrier has been drawn into said saline solution receptacle means, and actuating means for each of said plurality of said substance injection means to inject substance into said blood when said saline solution barrier has been drawn into said saline solution receptacle means.

13. Apparatus for utilizing the permanent long-term intubation of the abdominal aorta or other blood vessel of a laboratory animal for the purpose of collecting a plurality of blood samples from the animal and injecting substances into the animal's circulatory blood system comprising, a Y-tube having a leg and a pair of arms, means for connecting said leg to an implanted tube of the animal, a saline solution supply means mounted at the end of one of said arms and in communication therewith, a saline solution receptacle means mounted at the end of the other of said arms and in communication therewith to provide a liquid valve against the animal's blood system, a plurality of blood collection receptacle means mounted in spaced relation along a portion of said leg of said Y-tube and in communication therewith, a plurality of substance injection means mounted in spaced relation along another portion of said leg of said Y-tube and in communication therewith, a saline solution barrier in said Y-tube, actuating means for said saline solution supply means to express saline solution into said Y-tube, actuating means for said saline solution receptacle means to withdraw saline solution from said Y-tube, actuating means for each of said plurality of blood collection receptacle means to withdraw blood from said Y-tube when said saline solution barrier has been drawn into said saline solution receptacle means, actuating means for each of said plurality of said substance injection means to inject substance into said blood when said saline solution barrier has been drawn into said saline solution receptacle means, means for automatically cycling said actuating means for said saline solution receptacle means, said plurality of blood collection receptacle means and said saline solution supply means through a sampling cycle to successively withdraw saline solution from said Y-tube into said saline solution receptacle means, withdraw a blood sample from said Y-tube into one of said blood collection receptacle means, and express saline solution into said Y-tube from said saline solution supply means to restore said barrier in repetitive cycles, and means for conditioning said actuating means associated with said blood collection receptacle means to actuate a different blood collection receptacle means during each cycle in a pre-selected order of succession, means for monitoring selected physiological conditions of the animal, means responsive to the detection of specific conditions of said monitoring means to cycle said actuating means through a single said blood sampling cycle, means responsive to signals from a remote signalling station to cycle said actuating means through a single said blood sampling cycle, means for automatically cycling said actuating means through a substance injection cycle to successively withdraw saline solution from said Y-tube into said saline solution receptacle means, inject a substance into said Y-tube from one of said substance injection means, and express saline solution into said Y-tube from said saline solution receptacle means to restore said barrier in repetitive cycles, and means for conditioning said actuating means associated with said substance injection means to actuate a different substance injection means during each cycle in a pre-selected order of succession, means for coordinating the activation of said means for automatically cycling said sampling cycle and said means for automatically cycling said substance injection cycle, and means, including means responsive to signals from a remote station and means responsive to the detection of specific conditions of said monitoring means, to render said sampling cycle non-responsive to said monitoring means for said sampling cycle when said automatic cycling for said substance injection cycle is activated.

14. Apparatus as claimed in claim 4, and in which blood-pressure sensitive means is connected to communicate with the said saline solution barrier.

15. Apparatus as claimed in claim 6, and in which blood-pressure sensitive means is connected to communicate with the said saline solution barrier in said Y-tube.

16. Apparatus for utilizing the long-term intubation of the abdominal aorta or other blood vessel of a laboratory animal and the like comprising, a blood column tube, means for connecting one end of the said blood column tube to an implanted tube of the animal, terminal receptacle means mounted at the other end of said blood column tube, and in communication therewith, lateral receptacle means mounted along said blood column tube and in communication therewith, means for introducing a saline solution barrier in said blood column tube to provide a liquid valve against the animal's blood system, actuating means for said lateral receptacle means to maintain fluid from said blood column tube in said lateral receptacle means, and blood-pressure sensitive means connected to communicate with the receptacle means in contact with the said saline solution barrier.

17. Apparatus as claimed in claim 16 and in which the receptacle means comprises at least a pair of spaced arms forming, together with the said blood column tube, a substantially Y-shaped tube.

18. Apparatus as claimed in claim 17 and in which means is provided for automatically cycling the said actuating means through a sampling cycle successively to withdraw saline solution from said blood column tube into said terminal receptacle means.

19. Apparatus as claimed in claim 18 and in which there is provided means for monitoring the psychological condition of the animal as represented by the response of the said blood-pressure sensitive means, and means responsive to signals from a remote signalling station to cycle said actuating means.

References Cited in the file of this patent
UNITED STATES PATENTS 2,608,866    Breedlove et al.    Sept. 2, 1952
2,954,028    Smith    Sept. 27, 1960